Jan. 2, 1968　　　　　M. W. MYERS　　　　　3,360,874
REGROUPING TEACHING AID
Filed Feb. 17, 1965　　　　　　　　　　　2 Sheets-Sheet 1
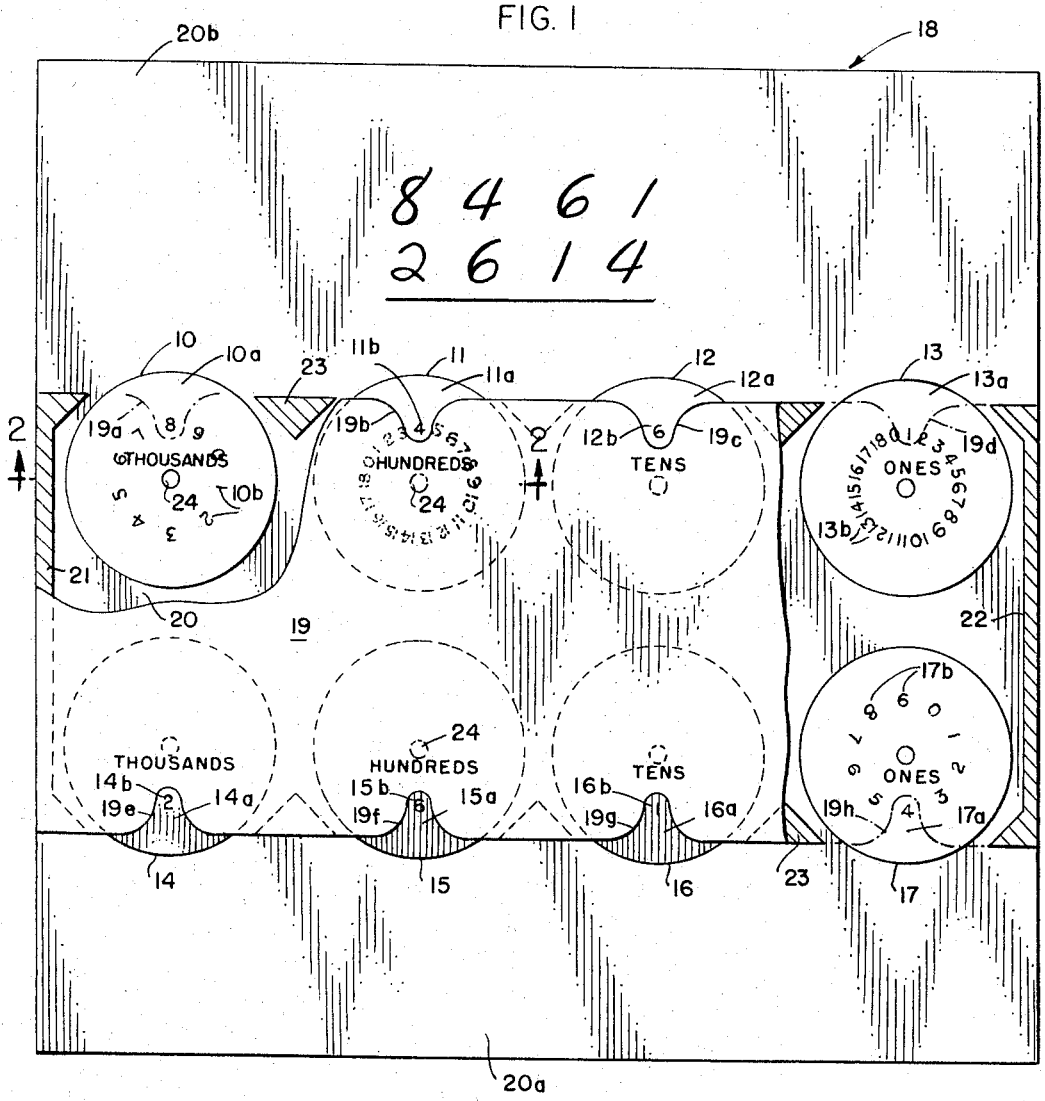
INVENTOR:
MAX W. MYERS
BY
Dawson, Tilton, Fallon, Lungmus & Alexander
ATT'YS Jan. 2, 1968   M. W. MYERS   3,360,874
REGROUPING TEACHING AID
Filed Feb. 17, 1965   2 Sheets-Sheet 2

INVENTOR:
MAX W. MYERS
BY
Dawson, Tilton, Fallon, Lungmus & Alexander
ATT'YS

United States Patent Office 3,360,874
Patented Jan. 2, 1968

3,360,874
REGROUPING TEACHING AID
Max W. Myers, 819 Douglas St., Pontiac, Ill. 61764
Filed Feb. 17, 1965, Ser. No. 433,344
5 Claims. (Cl. 35—31)

ABSTRACT OF THE DISCLOSURE

Apparatus for teaching subtraction requiring borrowing or regrouping wherein two horizontal rows of numeral-bearing dials are employed. All of the dials in the upper row to the right of the leftward-most dial bear sequential numbers from 0 to 18, while the rest of the dials bear at least numbers from 0 to 9. This permits the borrowing or regrouping operation to be visually observed with all dials in the upper row except for the left-hand-most dial for which there is no need for regrouping. The apparatus can also include a writing surface extending below the lower row of dials for recording the answer to the subtraction problem, and a writing surface above the upper row of dials to record a subtraction problem before it is performed on the dials.

Background

In teaching subtraction to children in the primary grades, difficulties are frequently encountered with problems which require borrowing of a number from the next higher place in order to permit the subtraction. This borrowing process is known technically as "regrouping." In teaching abstract mathematic conceptions such as regrouping, it is desirable to provide the child with a visual learning aid which will assist the child in understanding the concept through specific, concrete situations. Heretofore, the primary teacher has had no special teaching aid for regrouping, and has had to rely upon ordinary demonstrations using a blackboard or paper.

Summary

This invention provides an apparatus which facilitates the teaching of substraction requiring regrouping. The apparatus can be made in large sizes for class demonstration purposes, or in smaller sizes for individual use by the pupils. The regrouping teaching aid permits both the problem and answer to be recorded, and also provides means for carrying out the borrowing or regrouping process so that it may be visually followed and understood by the pupil.

Drawings

An illustrative embodiment of the present invention is shown in the accompanying drawings, wherein:

FIGURE 1 is a top plan view of the regrouping teaching aid, portions of the top plate of the holder being broken away to show the underlying numeral-bearing dials;

FIGURE 2 is a partial sectional view of the apparatus of FIG. 1 taken on line 2—2 thereof;

Description

Figure 3:
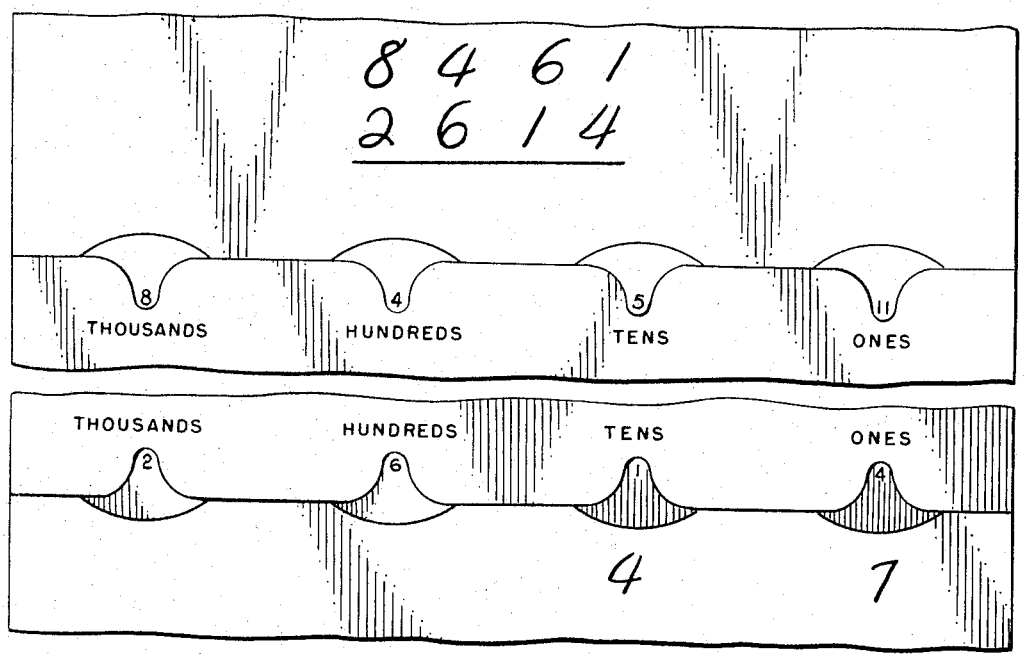
FIGURE 3 is a partial plan view of the apparatus of FIG. 1 illustrating the use of the apparatus in performing a subtraction requiring regrouping, portions of the apparatus being broken away to permit a more concise showing.

As previously indicated, the apparatus of the present invention is designed primarily for teaching subtraction requiring regrouping, but it can be used for other subtraction and addition. The apparatus comprises an assembly of rotatively-mounted dials 10, 11, 12, 13, and 14, 15, 16, 17, which respectively have numeral-bearing faces 10a, 11a, 12a, 13a, and 14a, 15a, 16a, and 17a thereon. The numerals on the faces of the dials are respectively designated by the numbers 10b, 11b, 12b, 13b, and 14b, 15b, 16b, and 17b. In the illustration given, the numbers are arranged in a circular pattern, and approximately equal spaces are provided between the numbers.

In accordance with the present invention, the dials are arranged in two horizontal rows of at least two dials per row, with each of the dials in the lower row aligned vertically with a dial of the upper row. In the illustration given, four dials are provided in each row, the upper row containing dials 10, 11, 12 and 13, and the lower row containing dials 14, 15, 16 and 17. As will be noted, the vertically-aligned dials are 10 and 14, 11 and 15, 12 and 16, and 13 and 17.

Holder means designated generally as 18 is provided for supporting and enclosing the dials. The holder means includes a cover 19 which extends over the numeral-bearing faces of the dials. The cover 19 provides horizontally and vertically aligned numeral-revealing openings 19a, 19b, 19c, 19d, 19e, 19f, 19g, and 19h. In the illustration given, these openings comprise slots which extend inwardly, respectively, from the top and bottom edges of cover 19, but the openings can also take the form of apertures or windows. In the embodiment shown, the openings 19a, 19b, 19c, and 19d extend inwardly from the upper edge of the cover 19, while the openings 19e, 19f, 19g, and 19h extend inwardly from the lower edge thereof. As will be noted, the numeral-revealing openings are arranged so that each opening respectively registers with the numerals on one of the dials as the dial is rotated. For example, opening 19a registers with the numeral 10b of dial 10, opening 19b registers with the numeral 11b of dial 11, etc. The openings 19a, 19b 19c and 19d are horizontally aligned with each other, while each of these openings is respectively vertically alinged with one of the lower openings, opening 19a being aligned with opening 19e, opening 19b vertically aligned with opening 19f, and so on.

For the purpose of achieving the advantages of the present invention, it is important to provide a particular arrangement of the numerals on the dials. More specifically, all of the dials in the upper row to the right of the leftward-most dial therein should bear sequential numbers from 0 to 18. As shown in FIG. 1, the dials 11, 12 and 13 bear sequential numbers from 0 to 18, being the numerals 11b, 12b, and 13b. The rest of the dial faces should bear at least numerals from 0 to 9. As shown in FIG. 1, dials 10, 14, 15, 16 and 17 bear numerals from 0 to 9, being the numerals 10b, 14b, 15b, 16b and 17b. If desired, for convenience and simplicity of manufacture, all of the dials can be made identical and provided with numerals from 0 to 18, although this is not essential for the operation of the device, as will be apparent from the subsequent description.

Holder 18 and the dials which it contains may be constructed in various ways while achieving the results of the present invention. In the illustration given, holder 18 is formed from a flat base plate 20 which extends upwardly and downwardly beyond the smaller flat plate 19 which provides the cover for the flat discs which form the dials 10–17. The cover plate 19 extends horizontally across the central portion of the base plate 20. Means is provided for supporting cover plate 19 at a spaced distance above the base plate. In the illustration given, the support means comprises end supports 21 and 22, and intermediate supports 23 which are provided adjacent the upper and lower edges of plate 19 between the adjacent dials. The plates 19 and 20 and the supports, 21, 22 and 23 may be assembled in any suitable way, such as by using a suitable adhesive. The dials 10–17 are rotatively-mounted on pins 24 which extend through the centers of the dials and into the plates 19 and 20 within which they are secured, as shown more clearly in FIG. 2.

It will be understood that suitable means should be provided for rotating the dials. In the illustration given, the dials respectively extend outwardly beyond the top and bottom edges of the plate 19, thereby permitting the dials to be rotated by applying the fingers to the outwardly-extending portions of the dials. Where the individual dials are not accessible for manual rotation, as where they are substantially completely covered by the plate 19, and apertures are provided in the plates for viewing the numerals, other means can be provided for rotating the dials. For example, the pins 24 can be extended upwardly and knobs attached to the upper ends thereof, thereby permitting the dials to be rotated by turning the knobs when the dials are fixed to the pins and the pins are rotatable with respect to the plates 19 and 20. Since this modification does not form an essential part of the present invention, it is not believed that it will be necessary to further describe or illustrate it herein.

It will be understood that the apparatus of the present invention may have two or more dials. For most applications, it is preferred that at least four dials be provided in each row. Usually, the preferred form of the apparatus will contain from four to eight dials in each row, although more than eight dials can be used, if desired.

In order to provide a writing surface for recording the answer to a subtraction problem carried out with the dials, the holder 18 can extend below the lower row of the dials. In the illustration given, base plate 20 has a downward extension 20a which provides a writing surface on the upper face thereof. Similarly, the holder 18 may be extended upwardly beyond the upper row of dials to provide a writing surface for recording a subtraction problem to be performed on the dials. In the illustration given, base plate 20 has an upward extension 20b which provides a writing surface on the upper face thereof.

The apparatus of the present invention may be constructed of various materials, such as plastic, wood, cardboard, hardboard, etc. In one preferred embodiment, all of the components are formed of a suitable plastic. Usually, the plate 19, as well as the plate 20, would be of an opaque material. Since such constructions are well known for other purposes, it is not believed it will be necessary to further describe them herein.

Figure 4:
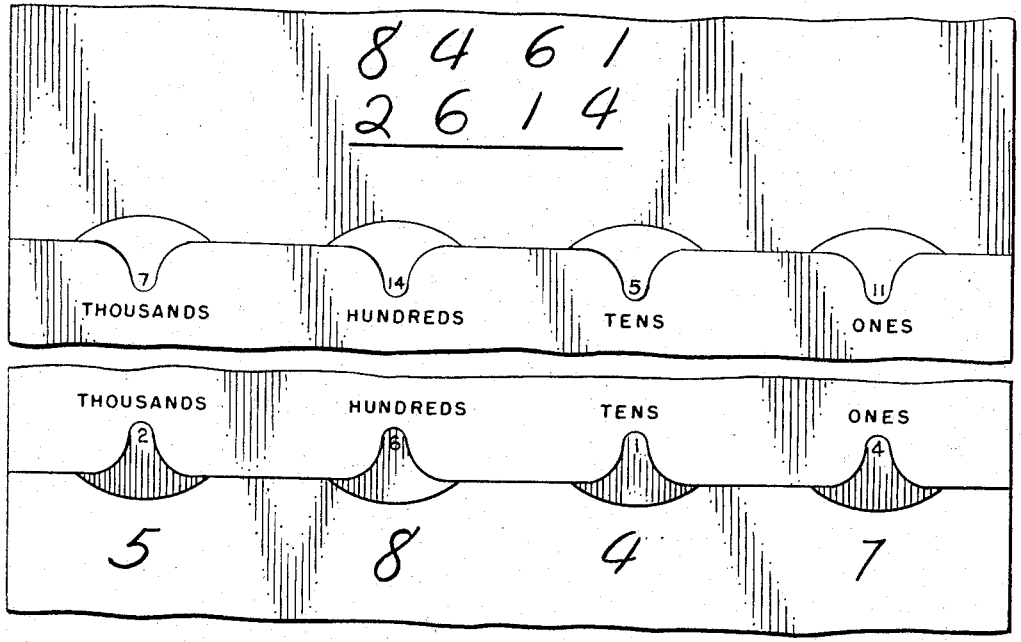
FIGURE 4 is a partial plan view similar to FIG. 3, showing the completion of the subtraction operation.

The operation of the apparatus of the present invention is further illustrated by the sequence of FIGURES 1, 3 and 4. Starting with FIG. 1, a subtraction problem has been written, for example, with chalk, on the writing surface provided by upper extension 20b. The specific problem illustrated is to subtract 2614 from 8461.

As a first step, the numeral 8461 is set on the upper row of dials, and the number 2614 on the lower row. If desired, the portion of the plate 19 overlying each of the dials may be lettered to indicate the place represented by the numerals on the dials, such as "ones," "tens," "hundreds" and "thousands." This is desirable as facilitating the visualization of the regrouping process. After the setting has been completed, the numerals 8, 4, 6, and 1 will be respectively visible through the openings 19a, 19b, 19c and 19d, while the numerals 2, 6, 1 and 4 will be respectively visible through the openings 19e, 19f, 19g and 19h.

The next step in the operation is illustrated in FIG. 3. Starting with the "ones" place dial, it can be seen that it is not possible to subtract "4" from "1." Consequently, it is necessary to borrow 10 from the numeral on the dial 12 to add to the numeral on the dial 13. With the apparatus of this invention, this borrowing or regrouping step can be performed by simply rotating the dial 12 to the numeral 5, thereby reducing it by 10, and adding the 10 to the numeral on the dial 13 by rotating the dial to the numeral "11." The appearance of the dials after the completion of this step is shown in FIG. 3, with the numeral "5" visible in the opening 19c and the numeral "11" visible in the opening 19d.

The remaining steps in the operation are illustrated in FIG. 4. Starting with the "ones" place dial, 4 can be subtracted from 11 to give 7, which is entered on the lower writing surface provided by extension 20a. In the "tens" place, 1 can be subtracted from 5 to give 4, which is also entered on the lower writing surface. However, in the "hundreds" place dial, 6 cannot be subtracted from 4 without a further regrouping. This is performed in the same manner as previously described, with 1000 being borrowed from dial 10 and added to dial 11. When this is completed, the numeral "7" will appear in the window 19a and the numeral "14" in the window 19b, as shown in FIG. 4.

Continuing with the example of FIG. 4, the "6" in the "hundreds" place can now be subtracted from 14 to give 8, which is entered on the lower writing surface. The problem is completed by subtracting 2 from 7 to give 5 in the "thousands" place, which is also entered on the lower writing surface, thereby giving the correct answer of "5847."

From what has been set forth, it will be readily apparent that the apparatus of this invention can be constructed in various sizes, such as a large size for class demonstration, and smaller sizes for individual use by the pupils. Ideally, a large class-size model is used in conjunction with smaller, pupil-sized models. The teacher can then explain the process on the large model, and the pupils can practice the regrouping process on the individual units.

It will also be apparent that the apparatus of this invention can be readily adapted for use with number systems having different bases than 10. Whatever the particular base, a similar problem of regrouping is encountered, and this can be taught in the same manner as previously described.

In the illustration given, the cover plate 19 is provided with legends over the respective dials of "ONES," "TENS," "HUNDREDS," and "THOUSANDS." These legends, of course, apply to the base 10, but as indicated the apparatus can be used for other bases. Suitable means for noting the particular base employed can be provided on plate 19, such as blackboard strips or writing surfaces, on which can be entered the place values for the different base, so far as the numerals on the dials will allow. For example, for base 7, the dials 13 and 17 will continue to represent "ONES," while the dials 12 and 16 would represent "SEVENS," the dials 11 and 15 "FORTY-NINES," and the dials 10 and 14 "343's."

The apparatus can also be used for substractions which do not involve regrouping, or it can be used for ordinary addition problems. However, as previously indicated, the primary advantage of the present apparatus is in teaching subtraction involving regrouping.

While in the foregoing specification this invention has been described in relation to a specific embodiment thereof and many details have been set forth for purpose of illustration, it will be apparent to those skilled in the art that the invention is susceptible to other embodiments and that many of the details set forth herein can be varied considerably without departing from the basic principles of the invention.

I claim:

1. In an apparatus for teaching subtraction requiring regrouping, an assembly of rotatively-mounted dials having numeral-bearing faces, said dials being arranged in two horizontal rows of at least two dials per row, with each of the dials in the lower row aligned vertically with a dial of the upper row, holder means for supporting and enclosing said dials, including a cover extending over the said numeral-bearing faces thereof, said cover providing horizontally and vertically aligned numeral-viewing openings, each opening registered in sequence with the numerals on one of said dials as the dial is rotated, all of the dials in the upper row to the right of the leftward-most dial therein bearing only the sequential numerals on said faces from 0 to 18, and the rest of said dial faces bearing only the sequential numerals from 0 to 9.

2. The apparatus of claim 1 wherein at least four of said dials are provided in each of said rows, the three dials in the upper row to the right of said leftward-most dial each bearing said sequential numerals on their faces of 0 to 18.

3. The apparatus of claim 1 in which a portion of said holder means extends substantially below the lower row of said dials and provides a writing surface on said extending portion for recording the answer to a subtraction problem carried out with said dials.

4. The apparatus of claim 1 in which a portion of said holder means extends substantially above the upper row of said dials and provides a writing surface on said extending portion for recording a subtraction problem to be performed on said dials.

5. In an apparatus for teaching subtraction requiring regrouping, an assembly of rotatively-mounted dials having numeral-bearing faces, said dials being arranged in two horizontal rows of at least four dials per row, with each of the dials in the lower row aligned vertically with a dial of the upper row, holder means for supporting and enclosing said dials, including a cover extending over the said numeral-bearing faces thereof, said cover providing horizontally and vertically aligned numeral-viewing openings, each opening registering in sequence with the numerals on one of said dials as the dial is rotated, all of the dials in the upper row to the right of a leftward-most dial therein bearing only the sequential numerals on said faces from 0 to 18, the rest of said dial faces bearing only the sequential numerals from 0 to 9, and said holder means providing extensions respectively above and below the upper and lower rows of said dials, said upper extension providing a writing surface for recording a subtraction problem to be performed on said dials, said lower extension providing a writing surface for recording the answer to a subtraction problem carried out with said dials.

References Cited

UNITED STATES PATENTS

| | | | |
|---|---|---|---|
| 234,247 | 11/1880 | Classen | 35—32 |
| 1,131,314 | 3/1915 | Bedell | 235—114 |
| 1,193,441 | 8/1916 | Stroud | 235—114 |
| 3,129,518 | 4/1964 | Burris | 35—31.4 |

EUGENE R. CAPOZIO, *Primary Examiner.*

W. GRIEB, *Assistant Examiner.*